US012629236B2

(12) United States Patent
Lichtensteiger

(10) Patent No.: US 12,629,236 B2
(45) Date of Patent: May 19, 2026

(54) VACUUM FILM FOR SCANNING AN ORAL CAVITY

(71) Applicant: Ivoclar Vivadent AG, Schaan (LI)

(72) Inventor: Markus Lichtensteiger, Montlingen (CH)

(73) Assignee: Ivoclar Vivadent AG, Schaan (LI)

( * ) Notice: Subject to any disclaimer, the term of this patent is extended or adjusted under 35 U.S.C. 154(b) by 294 days.

(21) Appl. No.: 18/468,831

(22) Filed: Sep. 18, 2023

(65) Prior Publication Data

US 2024/0090985 A1 Mar. 21, 2024

(30) Foreign Application Priority Data

Sep. 19, 2022 (EP) ..................................... 22196279

(51) Int. Cl.
*A61C 9/00* (2006.01)

(52) U.S. Cl.
CPC ............ *A61C 9/008* (2013.01); *A61C 9/0053* (2013.01)

(58) Field of Classification Search
CPC ......... A61C 9/0053; A61C 9/008; A61C 5/90; A61C 17/10; A61C 17/08; A61C 17/06; A61C 9/006; A61C 9/0066; A61C 9/0073; A61B 1/00142; A61B 1/015; A61B 90/05; A61B 90/40; A61B 2090/401; A61B 1/24; A61B 5/0088; A61B 90/39; A61B 2090/3908; A61B 2090/3937; A61M 1/90
USPC ........................................................... 356/600
See application file for complete search history.

(56) References Cited

U.S. PATENT DOCUMENTS

| | | | | |
|---|---|---|---|---|
| 3,324,855 A * | 6/1967 | Heimlich | ................ | A61M 1/84 |
| | | | | 401/133 |
| 4,918,715 A * | 4/1990 | Krupnick | ............... | A61B 90/18 |
| | | | | 378/162 |
| 9,662,246 B2 * | 5/2017 | Collinson | ........... | A61F 13/0206 |
| 2005/0226912 A1 | 10/2005 | Lowery | | |
| 2013/0150815 A1 * | 6/2013 | Luckemeyer | ..... | A61F 13/01017 |
| | | | | 604/319 |
| 2016/0262856 A1 * | 9/2016 | Atiya | ................. | A61B 1/00193 |
| 2017/0007386 A1 | 1/2017 | Mason et al. | | |
| 2018/0303330 A1 | 10/2018 | Rohner et al. | | |
| 2021/0220530 A1 * | 7/2021 | Shuler | ................... | A61M 1/915 |
| 2022/0287795 A1 * | 9/2022 | Nomura | .................... | C09J 7/38 |
| 2022/0409335 A1 * | 12/2022 | Osmani | .................... | A61C 7/08 |

* cited by examiner

*Primary Examiner* — Eric J Rosen
*Assistant Examiner* — Luis Ruiz Martin
(74) *Attorney, Agent, or Firm* — Ann M. Knab; Thad McMurray

(57) ABSTRACT

A vacuum film (100) for scanning an oral cavity (101), having a perforation layer (103); a fiber layer (105) arranged on the perforation layer (103); and a texture layer (107) arranged on the fiber layer (105).

2 Claims, 3 Drawing Sheets

S101 the vacuum film is inserted into the oral cavity

S102 the air is sucked off from the vacuum film

S103 the texture of the texture layer is scanned by a scanner

VACUUM FILM FOR SCANNING AN ORAL CAVITY

CROSS-REFERENCE TO RELATED APPLICATIONS

This application claims priority to European Patent Application No. 22196279.8 filed on Sep. 19, 2022, the disclosure of which is incorporated herein by reference in its entirety.

TECHNICAL FIELD

The present invention relates to a vacuum film for scanning an oral cavity and a method for scanning an oral cavity.

BACKGROUND

The shape of oral cavities that have no or only a few teeth can only be captured with difficulty by intraoral scanners because the oral mucosa has only slight contours. US 20180303330 is directed to an image recording device for scanning the oral cavity and is hereby incorporated by reference.

SUMMARY

It is the technical aim of the present invention to improve scanning of an oral cavity by means of an intraoral scanner.

This technical task is solved by the subject matters according to the independent claims. Technically advantageous embodiments are the subject matter of the dependent claims, the description and the drawings.

According to a first aspect, the technical task is solved by a vacuum film for scanning an oral cavity, comprising a perforation layer; a fiber layer arranged on the perforation layer; and a texture layer arranged on the fiber layer. The vacuum film achieves the technical advantage that the shape of contourless soft tissue can also be detected by means of an optical intraoral scanner.

In a technically advantageous embodiment of the vacuum film, the vacuum film has an oval or a semi-oval shape. This achieves the technical advantage, for example, that the vacuum film used covers a large area of the oral cavity.

In a further technically advantageous embodiment of the vacuum film, the vacuum film includes a central fold. This achieves the technical advantage, for example, that the vacuum film can be inserted more easily into the oral cavity.

In a further technically advantageous embodiment of the vacuum film, the vacuum film comprises a connection for connecting a vacuum hose. This achieves the technical advantage, for example, that a vacuum can be generated in an easy manner by means of which the vacuum film is pressed against the oral cavity.

In a further technically advantageous embodiment of the vacuum film, the perforation layer has a plurality of openings. This achieves the technical advantage, for example, that the vacuum can spread efficiently in the vacuum film.

In a further technically advantageous embodiment of the vacuum film, the openings are arranged in a pattern, such as but not limited to, a hexagonal pattern. This achieves the technical advantage, for example, that air can be suctioned off evenly and the vacuum film can adhere to the oral cavity across extensive areas.

In a further technically advantageous embodiment of the vacuum film, the openings have a diameter between 0.1 mm and 2 mm.

This also achieves the technical advantage, for example, that the air can be removed from the vacuum film in a quick and efficient manner.

In a further technically advantageous embodiment of the vacuum film, the fiber layer comprises fibers such as, but not limited to, cellulose or cotton wool. This achieves the technical advantage, for example, that the vacuum film clings well to the oral cavity.

In a further technically advantageous embodiment of the vacuum film, the fiber layer has a thickness of between 0.1 mm and 2.0 mm or between 0.05 mm and 1.0 mm. This achieves the technical advantage, for example, that the wearing comfort of the vacuum film is improved.

In a further technically advantageous embodiment of the vacuum film, the texture layer has a pattern such as, but not limited to, a diamond pattern, a dot pattern or a cross pattern. This achieves the technical advantage, for example, that the shape of the oral cavity can be scanned particularly well.

In a further technically advantageous embodiment of the vacuum film, the texture layer comprises an elastic plastic film.

This achieves the technical advantage, for example, that the vacuum film adapts well to the shape of the oral cavity.

In a further technically advantageous embodiment of the vacuum film, the plastic film is formed from materials including, but not limited to, polyolefin or a thermoplastic elastomer. This achieves the technical advantage, for example, that particularly suitable materials are used.

In a further technically advantageous embodiment of the vacuum film, the plastic film has a thickness between 0.05 mm and 1.0 mm. This achieves the technical advantage, for example, that the vacuum film has good strength.

According to a second aspect, the technical object is solved by a method for scanning an oral cavity, comprising the steps of inserting a vacuum film according to the first aspect into the oral cavity; suctioning the air out of the vacuum film; and scanning the texture of the texture layer by means of a scanner. Thereby, the same technical advantages are achieved as by the vacuum film according to the first aspect.

In a technically advantageous embodiment of the method, the air is suctioned off via a vacuum hose. This achieves the technical advantage, for example, that air from the vacuum film can be removed in a simple manner.

BRIEF DESCRIPTION OF THE DRAWINGS

Exemplary embodiments of the invention are shown in the drawings and are described in more detail below, in which.

DETAILED DESCRIPTION

Figure 1:
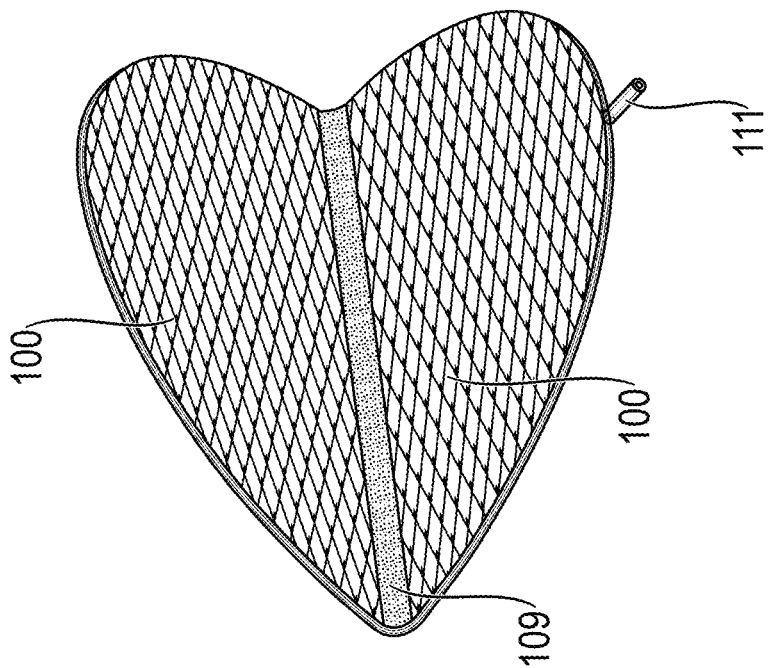
FIG. 1 shows a perspective view of an oral cavity and a vacuum film.
Figure 1:
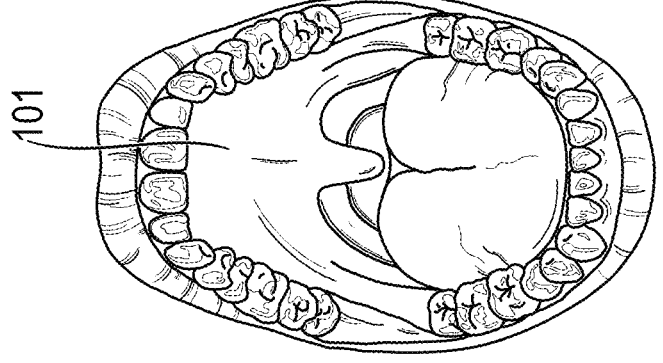

FIG. 1 shows a perspective view of an oral cavity 101 and a vacuum film 100. The vacuum film 100 is placed into the oral cavity of a patient and clings to the oral mucosa by applying a vacuum. The texture of the vacuum film 100 can then be optically recorded using an intraoral scanner to determine the shape of the oral cavity.

The vacuum film 100 has an oval shape with a central fold 109. This allows the vacuum film 100 to be easily inserted into the mouth of a patient and to adapt well to the oral cavity. For example, the vacuum film 100 has a length of at least 30 mm and a width of at least 50 mm. A semi-oval shape of the vacuum film can also be used.

Figure 2:
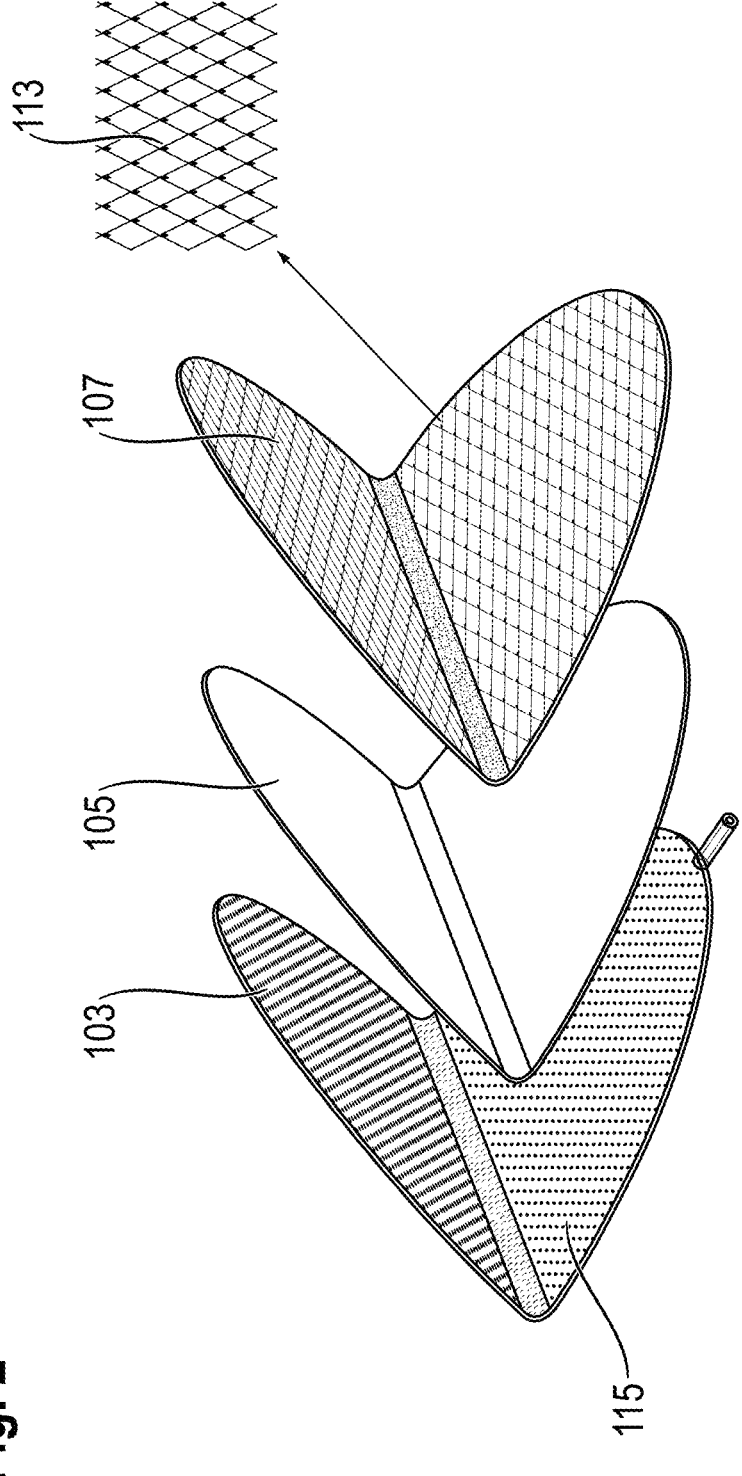
FIG. 2 shows a perspective view of the vacuum film structure.

FIG. 2 shows a perspective view of the structure of the vacuum film 100. The vacuum film 100 comprises at least three different layers in a sandwich composite.

The perforation layer 103 is perforated and conforms to the contour of the jaw. It has a plurality of openings 115 for this purpose. The openings 115 are arranged in a hexagonal pattern. The distance between the openings 115 is, for example, 20 mm. The size of the openings is, for example, 50 mm. The perforation layer 103 is formed, for example, from polyolefin or a thermoplastic elastomer and has a thickness of 0.05 mm to 2.0 mm.

The fiber layer 105 is arranged on the perforation layer 103 and comprises an absorbent and air-permeable material that is additionally suitable for draining. For example, the fiber layer 115 is formed of cellulose or cotton wool and comprises fibers of cotton wool. The thickness of the fiber layer 105 is, for example, 0.05 mm to 2.0 mm.

The texture layer 107 in turn is arranged on the fiber layer 107 and comprises an airtight barrier film provided with a geometric pattern. The texture layer 107 is formed, for example, from an air-impermeable and elastic plastic, such as a thermoplastic elastomer or polyolefin. The texture layer 107 may have a thickness of, for example, 0.05 mm-1.0 mm. The applied geometric pattern may be, for example, a diamond pattern, a line pattern, or a color pattern.

The perforation layer 103, the fiber layer 105, the texture layer 107 are connected to each other at the outer circumference thereof. Connection between the layers may be done by, for example, welding, such as ultrasonic welding or mirror welding.

On the front side of the vacuum film 100, there is a connection 111 through which the air can be suctioned off from the vacuum film 100. For this purpose, a hose may be connected through which the air is suctioned off.

When the air is suctioned off from the perforation layer 103 and the fiber layer 105, the vacuum film 100 is pressed against the oral cavity 101. The geometrical pattern of the clinging vacuum film 100 can then be easily captured by an intraoral scanner.

By using the vacuum film 100, fewer visits to the doctor are required and a digital workflow can be used from the beginning to the end of the treatment. The production of physical imprints is no longer necessary in this case.

Figure 3:
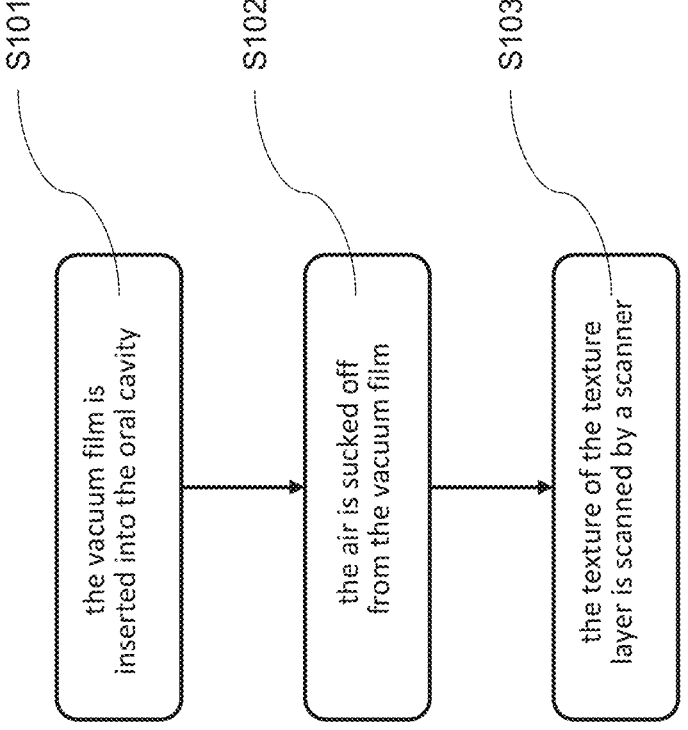
FIG. 3 shows a block diagram of a method for scanning an oral cavity.

FIG. 3 shows a block diagram of a method for scanning an oral cavity. In step S101, the vacuum film 100 is inserted into the oral cavity. Then, in step S102, the air is suctioned off from the vacuum film 100. Then, in step S103, the texture 113 of the texture layer 107 is scanned by a scanner. Thus, an accurate shape of the oral cavity 101 can be obtained during scanning.

The method using the vacuum film allows an edentulous jaw to be scanned by means of an intraoral scanner. In this case, it is no longer necessary to previously produce an imprint that is subsequently scanned.

All of the features explained and shown in connection with individual embodiments of the invention may be provided in different combinations in the subject matter of the invention to simultaneously realize their beneficial effects.

All method steps can be implemented by devices which are suitable for executing the respective method step. All functions that are executed by the objective features can be a method step of a method.

The scope of protection of the present invention is given by the claims and is not limited by the features explained in the description or shown in the figures.

REFERENCE SIGN LIST

100 vacuum film
101 oral cavity
103 perforation layer
105 fiber layer
107 texture layer
109 fold
111 connection
113 texture
115 opening

The invention claimed is:

1. A method for scanning an oral cavity, comprising the steps of:

inserting a vacuum film comprising a perforation layer, a fiber layer arranged on the perforation layer, and a texture layer arranged on the fiber layer, into the oral cavity;

suctioning off air from the fiber layer and perforation layer to cause the vacuum film to conform to the shape of the oral cavity; and scanning the conformed vacuum film using a scanner.

2. The method according to claim 1, wherein the air is suctioned off via a vacuum hose.

* * * * *